United States Patent [19]

Kobayashi et al.

[11] Patent Number: 4,486,482
[45] Date of Patent: Dec. 4, 1984

[54] VACUUM HEAT INSULATOR

[75] Inventors: Nobuyuki Kobayashi; Yoritsune Abe; Katuo Shibata; Yukio Watanabe, all of Tochigi, Japan

[73] Assignee: Hitachi, Ltd., Tokyo, Japan

[21] Appl. No.: 504,450

[22] Filed: Jun. 15, 1983

[51] Int. Cl.³ .................... B32B 17/02; B32B 1/02
[52] U.S. Cl. ............................ 428/69; 55/387; 428/74; 428/75; 428/76; 428/213; 428/920
[58] Field of Search ............. 428/75, 69, 74, 213, 428/920, 76; 55/387; 417/48

[56] References Cited

U.S. PATENT DOCUMENTS 3,179,549 4/1965 Strong et al. .................... 428/69
3,387,767 6/1968 Hecht .................... 417/48

Primary Examiner—Paul J. Thibodeau
Attorney, Agent, or Firm—Antonelli, Terry & Wands

[57] ABSTRACT

A vacuum heat insulator comprises compressed glass fibers, a planar thin metal plate and a drawn metal plate. A receptacle is air-tightly formed of the planar thin plate and the drawn metal plate. The glass fibers are encased in the receptacle under a vacuum condition. A small amount of the glass fibers is penetrated thereinto in a direction perpendicular to the heat transfer direction of the insulator by inserting needles having hook portions into the glass fibers whereby the compressed glass fibers are kept under a vacuum condition at a high density without any remarkable deformation.

7 Claims, 9 Drawing Figures

VACUUM HEAT INSULATOR

BACKGROUND OF THE INVENTION

1. Field of the Invention

The present invention relates to a vacuum heat insulator in which glass fibers are stacked at random in a receptacle which has a flat portion and is sealed under a vacuum condition.

2. Description of the Prior Art

A conventional vacuum heat insulator will now be described with reference to FIGS. 1 and 2. A vacuum heat insulator 1 is so constructed that glass fibers 5 of small diameters are stacked at random in a direction perpendicular to the heat transfer direction thereof within a plate-like receptacle 4 defined by a drawn thin steel plate or sheet 2 of low carbon and a planar stainless steel plate 3 while an interior of the receptacle 4 is sealed under a vacuum condition.

In such a vacuum heat insulator 1, since the receptacle 4 has a plate-like shape, when the interior of the receptacle 4 is made to be a vacuum condition, a great deforming force would be applied to the receptacle 4 at the planar portions of the two steel plates 2 and 3 thereof. On the other hand, since the glass fibers 5 are simply stacked at a low density in the receptacle 4, the glass fibers 5 are to be readily compressed by the deforming force applied to the receptacle 4, so that the receptacle 4 would be greatly deformed. Thus, there is a fear that it would be impossible to keep a space thickness required for the heat insulator. There is also a fear that upon deformation, a cracking would be generated in the receptacle 4 and it would be, therefore, impossible to keep the vacuum condition proper. For this reason, it is required that a degree of vacuum in the receptacle 4 is restricted and a deformation of the receptacle is to be suppressed. However, if the degree of vacuum is restricted, the insulating ability would be considerably degraded. In this case, since a density of glass fibers 5 becomes lower, a representative dimension of heat transfer of the space in the receptacle becomes large, so that a molecular free path is elongated and at the same time, the number of contacts between the glass fibers 5 becomes smaller, so that a thermal contact resistance becomes smaller. Due to such a phenomenon, the insulating ability would be unduly degraded.

SUMMARY OF THE INVENTION

A primary object of the present invention is to provide an improved vacuum heat insulator in which the glass fibers are so arranged that they are almost not deformed by the deforming force of the receptacle, so that a degree of vacuum in the receptacle is able to be enhanced so as to obtain a sufficient heat insulating ability, and in which a density of glass fibers is increased, so that a representative dimension of heat transfer of is able to be decreased and a thermal contact resistance is able to be increased.

To this end, the present invention provides a vacuum heat insulator comprising a receptacle defined by thin metal plates each having flat portion therein and glass fibers each having a small diameter stacked in a direction perpendicular to a heat transfer direction at random, the stacked glass fibers disposed in the receptacle, and the receptacle adapted to be sealed to keep an interior thereof in vacuum condition, characterized in that some glass fibers of said glass fibers are penetrated thereinto in a direction same to the heat transfer direction as penetration glass fibers, and the stacked glass fibers is kept in a compressed condition at a high density.

The above and other objects and features of the present invention will become apparent from a following description of the disclosure found in the accompanying drawings.

DESCRIPTION OF THE PREFERRED EMBODIMENTS

Figure 1:
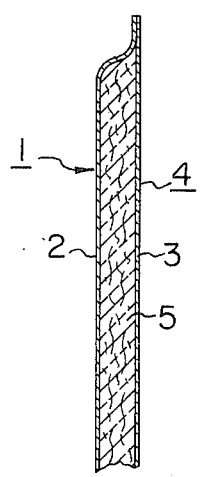
FIG. 1 is a cross-sectional view of a conventional vacuum heat insulator.
Figure 2:
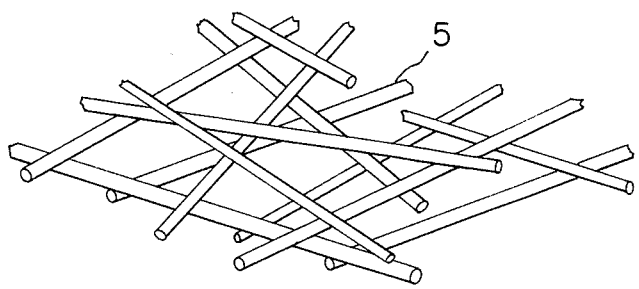
FIG. 2 is an illustration of glass fibers used in the vacuum heat insulator shown in FIG. 1.
Figure 3:
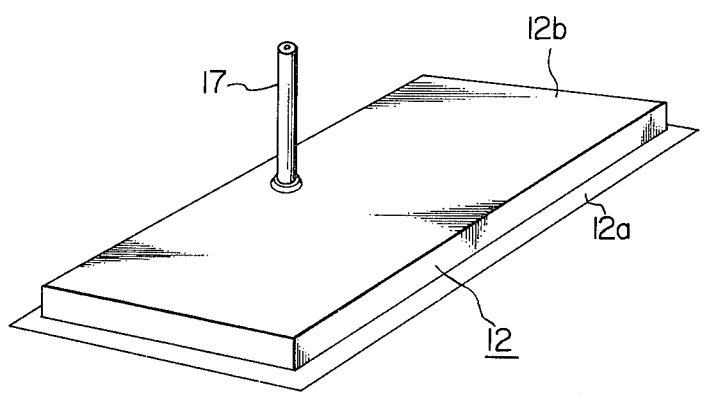
FIG. 3 is a perspective bottom view of a drawn thin metal plate to be used in a vacuum heat insulator according to the present invention.
Figure 4:
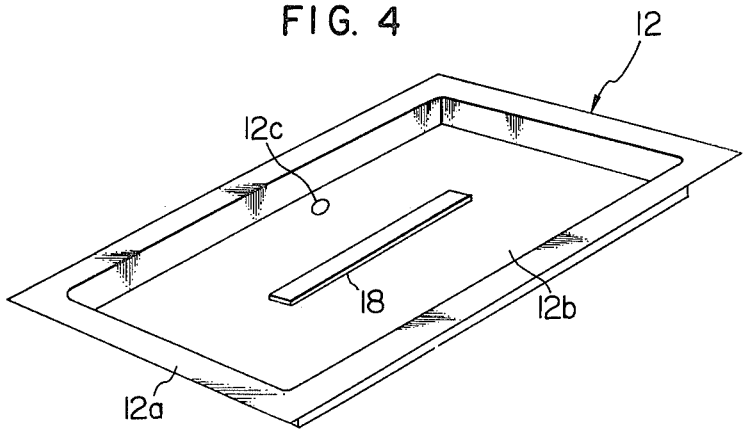
FIG. 4 is a perspective top view of the drawn thin metal plate shown in FIG. 3.

One preferred embodiment of the present invention will now be described with reference to FIGS. 3 through 9. Referring first to FIG. 3, a vacuum heat insulator 11 is so constructed that glass fibers 15 each having a small diameter are stacked at random in a direction perpendicular to a heat transfer direction thereof within a plate-like shape receptacle 14 which is defined by two thin metal plates 12 and 13 and the vacuum heat insulator 11 is sealed to keep an interior thereof in a vacuum condition. The metal plate 12 is, as shown in FIG. 4, drawn by the drawing process and provided a flange portion 12a with its peripheral edge and a reduction hole 12c within a part of a bottom portion 12b. The thin metal plate 12 is made of alloy of iron mixed with nickel and/or chrome. The thin metal plate 13 is in a plate-like shape and is thinner than the thin metal plate 12. The metal plates 12 and 13 are made of the same material to facilitate the welding therebetween. Due to the fact that the above-described alloy is used for the two metal plates 12 and 13, a heat conduction coefficient thereof is greatly reduced in the order of some tenth of that of the pure iron, so that a heat conduction loss through the contact portions between the metal plates 12 and 13 may be reduced. Moreover, it is prevented that a considerable amount of gas is generated from a surface and an interior of the metal plates after a cleaning process, a baking process and the like, so that a reduction of the degree of vacuum in the receptacle may be suppressed. In addition, the insulator is superior in the corrosion-resistance and in the mechanical strength, and even if it is thinned, there is no fault such as perforation and the insulator has a good machinability such as pressing and welding.

Figure 5:
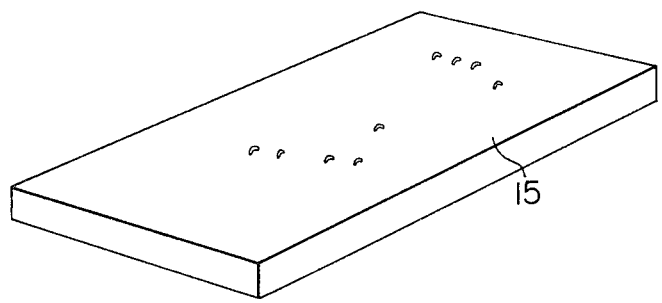
FIG. 5 is a perspective view of the stacked glass fibers cut out for use in the vacuum heat insulator according to the present invention.
Figure 6:
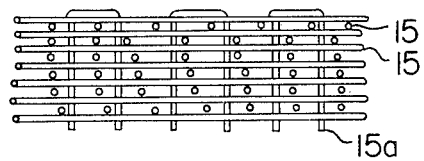
FIG. 6 is an enlarged cross-sectional view of the stacked glass fibers shown in FIG. 5.
Figure 9:
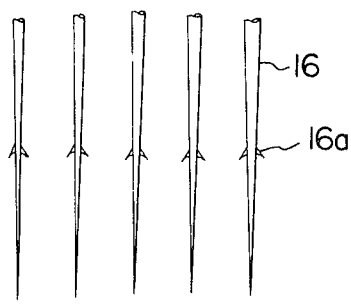
FIG. 9 is a frontal view of needles for manufacturing the stacked glass fibers shown in FIG. 5.

The glass fibers 15 to be used in the vacuum heat insulator do not contain the additives such as hardener or curing agents and adhesives. If such additives is contained in the glass fibers, the gas is generated from the additives, so that the degree of vacuum in the receptacle becomes worse. The glass fibers 15 are cut in a predetermined length and are dropped and sucked into a duct which is kept under a vacuum condition so that they are stacked at random. Therefore. the glass fiber stack may readily be formed. Since the glass fibers 15 are stacked on one another at random, they are in point contact with one another, so that the thermal contact resistance is increased and the insulating ability is improved. Under the condition that the glass fibers 15 stacked at random are compressed by applying pressures thereto from opposite sides, needles 16 each having hook portions 16a shown in FIG. 9 are inserted into the glass fibers 15, so that some external glass fibers 15 are hooked by the hook portions 16a and is penetrated thicknesswards serving as penetration fibers 15a and the compressed glass fiber stack is stitched by the external glass fibers. The friction between the penetration fibers 15a and the glass fibers 15 stacked at random may keep the stacked glass filers 15 in the compression condition even if the compressing pressures are released therefrom. A mat shaped glass fibers stack portion shown in FIG. 5 is cut off from the glass fibers stack. In case that the glass fiber 15 having an outer diameter of about ten microns is used, a ratio of cross-sectional areas of the penetration fibers 15a to the overall surface area of the mat shaped glass fibers stack portion is extremely small. For this reason, even if the penetration fibers 15a extend in the same direction as the heat transfer direction, a quantity of the heat transferring through the penetration fibers 15a is negligible with respect to the total heat transfer quantity. Incidentally, if the needles 16 are inserted into the glass fibers stack 15 from opposite sides, the smaller number of the penetration fibers 15a may keep the glass fibers stack in the compressed condition.

An air drawing pipe 17 to be connected to a vacuum pump (not shown) is welded to the reduction hole 12c of the drawn metal plate 12. A getter 18 is incorporated in the receptacle 14. The getter 18 serves to absorb the gas generated in the receptacle 14 to thereby keep the interior under a high vacuum condition for a long period of time.

Figure 7:
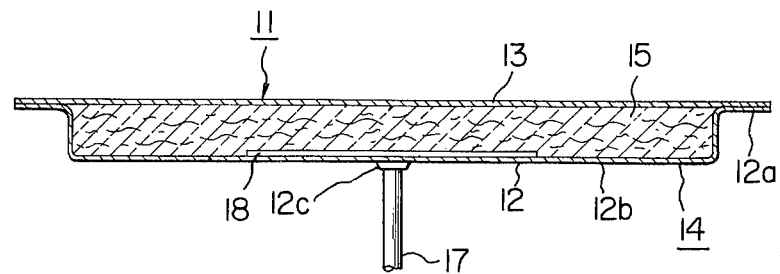
FIG. 7 is a cross-sectional view showing a state of the vacuum heat insulator according to the present invention before an air is drawn therefrom.
Figure 8:
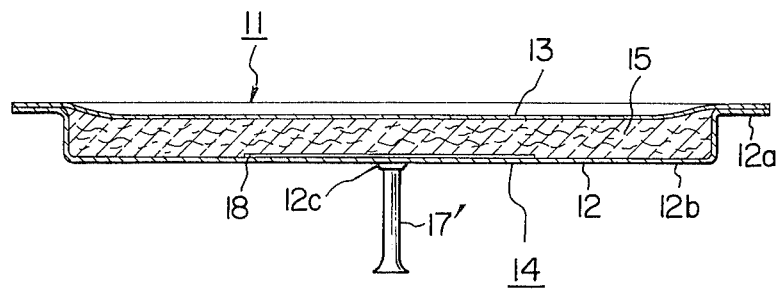
FIG. 8 is a cross-sectional view showing a state of the vacuum heat shown in FIG. 7 after an air is drawn therefrom.

A manufacturing of the insulator 11 will now be described. The air drawing pipe 17 is air-tightly welded to the reduction hole 12c of the drawn metal plate 12. In this case, the welding is carried out by a high temperature welding such as a brazing so as to be able to be durable against the later process of high temperature baking. Both the metal plates 12 and 13 are cleaned by fat-removing, acid-cleaning and so on. Also, the mat-shaped glass fibers stack portion 15 are subjected to the baking process for removing undesired molecules such as foreigners and impurity stuck to the surfaces by heating at a high temperature. The baking process may suppress the generation of gas in the receptacle 14. Subsequently, after the getter 18 is disposed on the bottom portion 12b of the metal plate 12 as shown in FIG. 4, the mat-shaped glass fibers stack portion 15 is disposed thereon and the planar metal plate 13 covers them. Then, the flanged portion 12a of the metal plate 12 and the associated outer peripheral portion of the planar metal plate 13 are air-tightly welded to each other as shown in FIG. 7. The welding is carried out by using a resistance welding, an electron beam welding and the like. These weldings are suitable for thin layer materials and are durable against a high temperature during the baking process. The fabricated insulator 11 is disposed in the furnace and an air is drawn therefrom through the drawing pipe 17 to thereby carry out the vacuum baking. Thus, the gas generated upon fabricating due to impurity stuck to or mixed into the insulator may be removed. When a desired degree of vacuum is reached, a part of the drawing pipe 17 is pressed and cut off to close it (FIG. 8). When the interior receptacle 14 is kept in the vacuum condition, a pressure of $1 \text{ kg/cm}^2$ is applied to the receptacle 14 so as to compress and deform the glass fibers 15. However, since the glass fibers 15 are encased in the receptacle at a high density, even if the vacuum degree is enhance, a thickness of the insulator is slightly decreased as shown in FIG. 8 unlike the prior art insulator in which the thickness thereof is greatly reduced. Therefore, the vacuum degree may be increased to enhance greatly the insulating ability and at the same time, a cracking or the like would not be generated in the receptacle 14. In this case, the planar metal plate 13 is thinner than the metal plate 12 and is in a plate-like shape, so the planar metal plate 13 has a flexibility and may readily be deformed. Accordingly, the metal plate 12 is prevented from being deformed. The insulator 11 may be incorporated at a high accuracy into an instrument which should be thermally insulated with using the undeformed metal plate 12 as a standard. Due to the fact that the planar metal plate 13 is thinner than the metal plate 13, the heat conduction from the drawn metal plate 12 is suppressed and heat loss thereof is decreased. Also, since the glass fibers 15 are encased at a high density, a representative dimension of heat transmission of the space is decreased and a molecular free path is shortened and the heat transmission efficiency may be greatly reduced. Therefore, since a desired insulating ability may be obtained even if the degree of vacuum is not so enhanced, it is possible to shorten a period of time for the air drawing. Furthermore, since the glass fibers 15 are encased at a high density, the number of contacts of glass fibers 15 becomes large to thereby remarkably increase the thermal contact resistance, whereby the heat conduction efficiency of glass fibers 15 may be extremely small. In addition, a heat radiation between the metal plates 12 and 13 may be prevented by the glass fibers 15.

As described above, according to the present invention, since the glass fibers encased in the receptacle is not so compressed by the deforming force applied to the receptacle, the degree of vacuum in the receptacle is able to be enhanced and the insulating ability is also able to be greatly enhanced. At the same time, there is no fear that a cracking or the like would be generated in the receptacle. Also, since the representative dimension of the heat transmission of the space in the glass fibers in the receptacle is extremely small, the molecular free path is shortened and the insulating ability may be greatly enhanced. Furthermore, the number of contacts of the glass fibers in the receptacle is increased, so that the thermal contact resistance is increased to thereby greatly enhance the insulating ability.

What is claimed is:

1. A vacuum heat insulator comprising a receptacle defined by thin metal plates each having a flat portion providing opposing walls of the receptacle and a stack of glass fibers contained in said receptacle, the majority of the fibers of said stack being arranged at random in a direction parallel to said walls and perpendicular to a heat transfer direction and said receptacle being adapted to be sealed to place the interior thereof in a vacuum condition; some of the glass fibers of said glass fiber stack having been penetrated thereinto as penetration glass fibers that extend in said heat transfer direction while said glass fiber stack is maintained in a compressed condition to provide a glass fiber stack of high density held together by said penetration glass fibers whereby, upon application of the vacuum condition to said receptacle, the opposing walls are deformed inwardly and are supported by said glass fiber stack.

2. A vacuum heat insulator according to claim 1, wherein said penetration glass fibers penetrate into said stack of glass fibers from opposite sides to provide loops of the penetration fibers on the opposite sides of said stack.

3. A vacuum heat insulator according to claim 1, wherein said receptacle is defined by a drawn thin metal plate and a planar sheet metal plate, and wherein a thickness of said planar sheet metal plate is smaller than that of said drawn thin metal plate.

4. A vacuum heat insulator according to claim 1, wherein said metal plates are made of an alloy selected from the group consisting of iron mixed with nickel, iron mixed with chrome, and iron mixed with nickel and chrome.

5. A vacuum heat insulator according to claim 1, wherein said glass fibers do not contain additives including hardening agent and adhesives.

6. A vacuum heat insulator according to claim 1, wherein said glass fibers are, prior to being placed in said stack, cut into a predetermined length.

7. A vacuum heat insulator according to claim 1, wherein said vacuum heat insulator further comprising a getter for absorbing gas disposed within said receptacle.

* * * * *